April 7, 1936.  S. R. WRIGHT  2,036,736
VOLTAGE FAILURE PROTECTION DEVICE
Filed Dec. 28, 1932  3 Sheets-Sheet 1
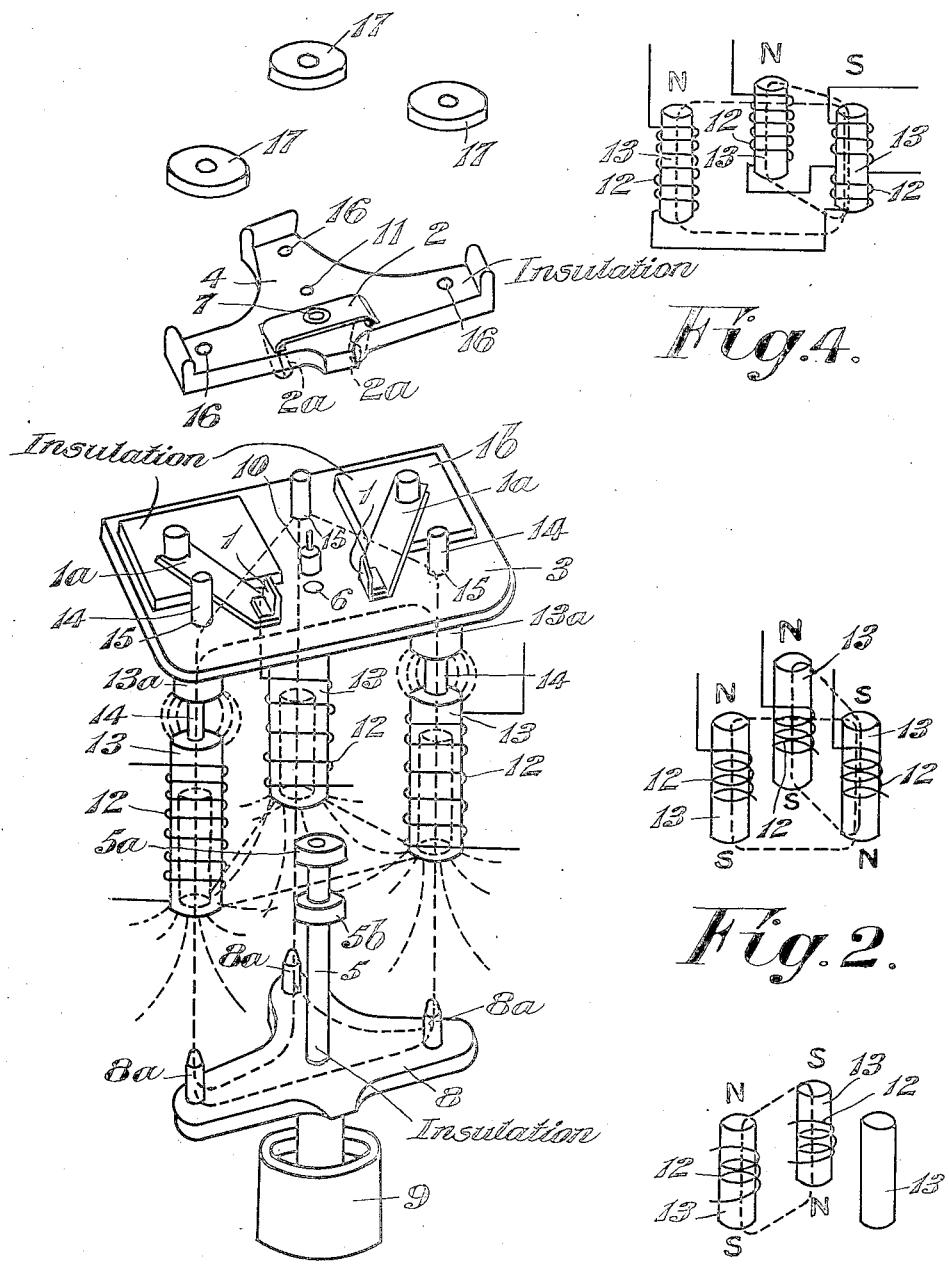

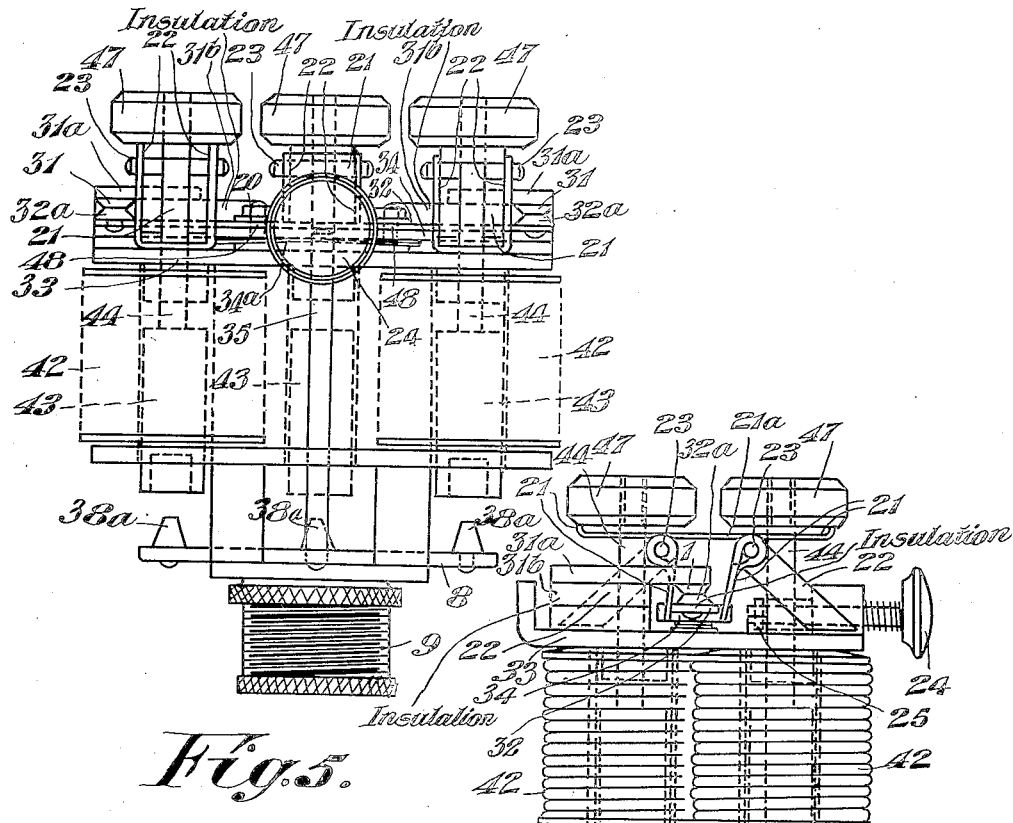
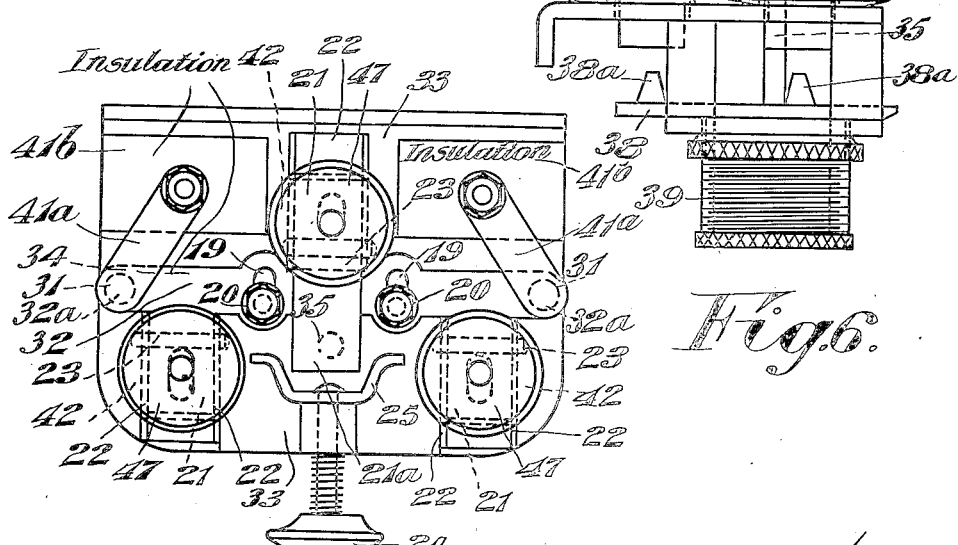
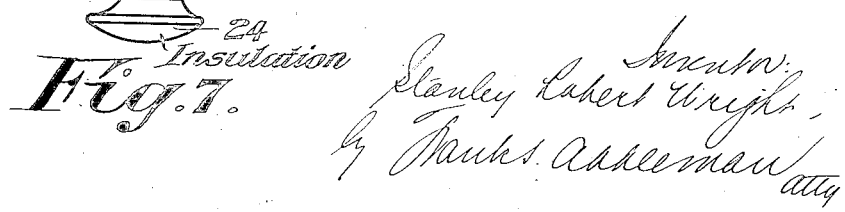

April 7, 1936.  S. R. WRIGHT  2,036,736
VOLTAGE FAILURE PROTECTION DEVICE
Filed Dec. 28, 1932  3 Sheets-Sheet 3
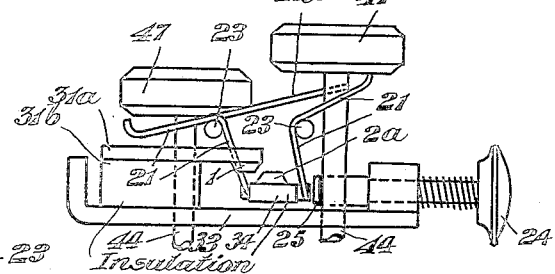
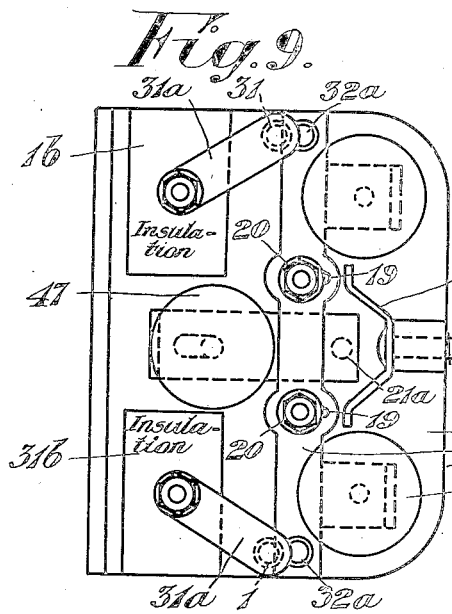
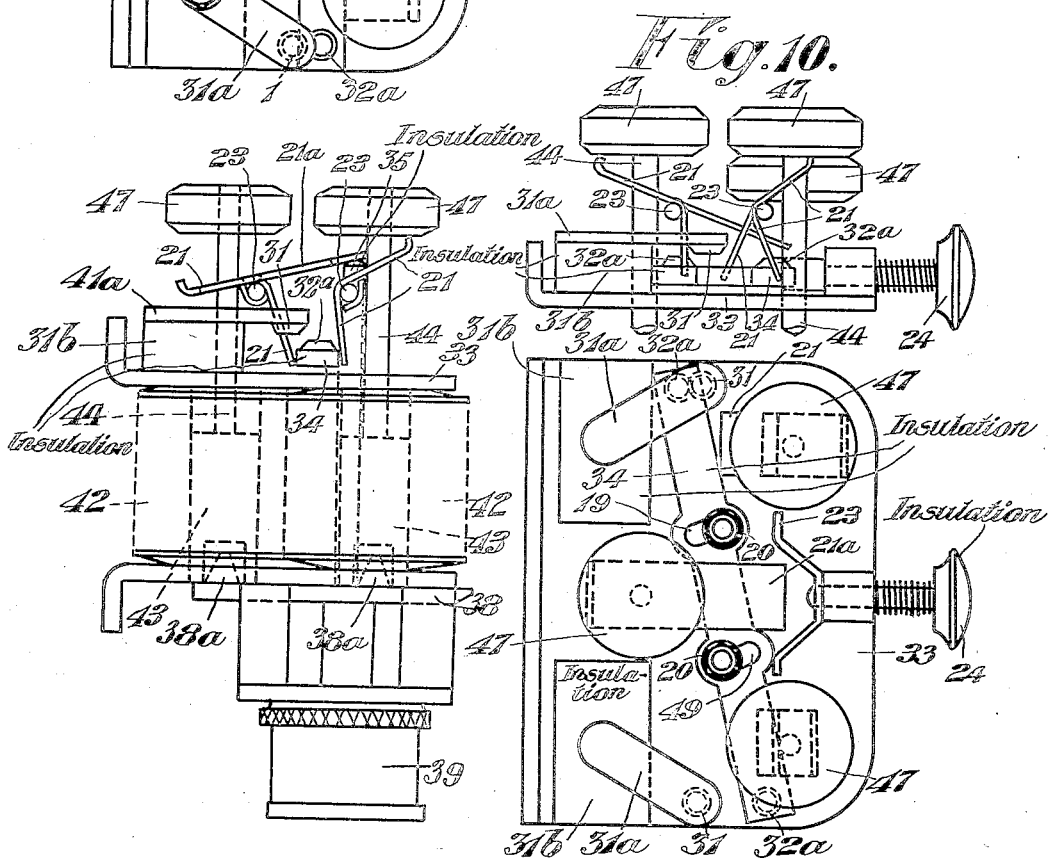

Patented Apr. 7, 1936

2,036,736

UNITED STATES PATENT OFFICE 2,036,736

VOLTAGE FAILURE PROTECTION DEVICE

Stanley Robert Wright, Bedford, England

Application December 28, 1932, Serial No. 649,230
In Great Britain December 30, 1931

9 Claims. (Cl. 200—98)

This invention relates to, and has for its object the provision of improvements in voltage failure protection devices for polyphase circuits.

The invention consists broadly of a voltage failure protection device for polyphase circuits, comprising three no-volt windings located parallel and equidistant to one another, independently movable plungers for the respective windings and magnetic plates at both ends of the plungers to complete the magnetic circuit through the plungers, the arrangement being such that if all the plungers move to the non-attracted position simultaneously, as by switching off the current the device fails to respond, but if any one of said plungers moves to the non-attracted position alone, as by voltage failure in one phase, said device responds.

In order that the invention may be the more clearly understood two voltage failure protection devices in accordance therewith will now be described, reference being made to the accompanying drawings, wherein:—

Figure 1 is a perspective view of the disassembled parts of one of said devices.

Figure 2 is a diagram of the magnetic linkage of the device of Figure 1 at a given moment.

Figure 3 is a similar diagram of the magnetic linkage after voltage failure in one phase.

Figure 4 is a diagram of the magnetic linkage at a given moment of the device of Figure 1 as modified for use in two phase circuits.

Figure 5 is a front elevation of the other device in its normal or de-energized state.

Figure 6 is a side elevation of the same looking from the left of Figure 5.

Figure 7 is a plan of the same.

Figure 8 is a side elevation of the same in the energized state but with one of the phases having failed.

Figure 9 is a plan of the same.

Figure 10 is a side elevation of the same in the energized state, but with a different phase having failed.

Figure 11 is a plan of the same.

Figure 12 is a side elevation of the same under the condition of overload.

Referring first to Figure 1 the device comprises two fixed contacts 1 and a movable contact 2 adapted to establish bridging connection between said fixed contacts. The fixed contacts 1 are mounted with their contact faces vertical and facing directly away from one another. The movable bridging contact 2 is in the form of a generally horizontal spring strip with its two ends bent downwardly. Said two ends carry inwardly facing round faced silver contact pieces 2a and as said movable contact 2 is moved downwards said contact pieces 2a engage the said outwardly facing contact faces of the fixed contacts, the downwardly bent ends of said moving contact being bent slightly outwardly against their bias so that good contact is established.

The fixed contacts 1 are supported by means of arms 1a and insulating blocks 1b in insulating relation from the upper side of a horizontal top plate 3 of magnetic material such as soft iron. The moving contact 2 is mounted on the top side of a plate 4 of insulating material the contacts 2a appearing in the underside of said plate. The insulating plate 4 together with the moving contact 2 is biased downwards to the position in which the moving contact is in its bridging position with respect to the fixed contacts, by means of a vertical insulating rod 5 passing through a hole 6 in the magnetic top plate 3 and also through registering holes at 7 in the insulating plate 4 and the center of the bridging contact 2. Said rod has a collar 5a mounted on its upper extremity and is biased downwards by the weight of an overload armature 8 at its lower extremity so that said collar 5a draws said insulating plate 4 and contact 2 downwards as stated. A dash pot 9 is provided which retards upward movement of the armature 8 and rod 5. The insulating plate 4 is universally pivoted about, and at the same time is free to rise with respect to a fixed pin 10 so located as to constitute, with the fixed contacts 1, the third apex of an approximately equilateral triangle of which the hole 6 is the center point. This fixed pin 10, which has a reduced upper end and an enlarged base as shown, upstands from the magnetic top plate 3, and the insulating plate 4 has a small hole 11 through it, through which the reduced upper end of this pivot pin 10 passes, and which is funnel shaped towards the upper surface to enable said insulating plate to pivot universally as stated. Thus said insulating plate 4 is normally drawn down to a position at which it is horizontal, with the ends of the bridging contact 2 down to a limiting bridging position with respect to the fixed contacts and with the small hole 11 through the insulating plate down to a limiting position against the enlarged base of the pivot pin 10. It should be further noted that the engagement of the round faced silver contact pieces 2a of bridging contact with the fixed contacts 1 is such as to enable the insulating plate 4 to pivot up and down about either of these contact pieces as center.

The device is adapted to be operated by means of three vertical solenoids 12 located underneath the top plate 3 and adapted to be connected in the respective phases of a three phase circuit. These solenoids are located so that their axes constitute, in plan, the apexes of an equilateral triangle of which the hole 6, as in the case of the former triangle constituted by the pin 10 and contacts 1, is the center point, and whose sides are parallel to, and considerably longer than the sides of said former triangle. The solenoids 12 have plungers 13 movable therein and these plungers have vertical rods 14 extending from their upper ends and passing through holes 15 in the magnetic top plate 3 and holes 16 in the insulating plate 4 above it. At their upper extremities these rods 14 have weights 17 secured thereon so that, when the solenoids 12 are energized and the plungers 13 lifted, these weights 17 will be lifted above the insulating plate 4 which will accordingly remain at its normal position. When the solenoids 12 are de-energized and the plungers 13 fall, these weights 17 will rest upon the insulating plate 4 which will support their entire weight and that of the plungers. If all these plungers 13 fall simultaneously, as by the switching off of the current, the balance of the insulating plate 4 will not be upset but will remain in its normal position. If one of said plungers 13 falls alone, however, as by voltage failure in that particular phase, the insulating plate 4 will be caused to tilt in such a way as to break contact between the bridging contact 2 and one or both of the fixed contacts 1. Thus if the plunger 13 whose axis is on the side of the pivot pin 10 remote from the bridging contact 2 should fall alone, the insulating plate 4 will be tilted about said pivot pin so that the bridging contact 2 disengages both fixed contacts 1. If either of the other two plungers 13 should fall alone said insulating plate 4 will tilt about the adjacent silver contact piece 2a so that the other silver contact piece will be lifted out of engagement with its fixed contact 1.

It will be noted that in any case the tilting of the plate 4 involves the lifting through a small distance of the rod 5 and armature 8 against the retarding influence of the dash pot 9. Thus there is a brief time interval between the failure of a phase and the opening of the contacts.

The overload armature 8 is located horizontally at the lower end of the three solenoids 12, and upon the occurrence of overload in one or more of the solenoids said armature is drawn upwardly until a collar 5b on the center rod 5, which collar is normally spaced some distance underneath the insulating plate 4, engages said insulating plate and thereby lifts it bodily so that the bridging contact 2 disengages the fixed contacts 1.

This armature 8 is connected to the plunger of the dash pot 9 through the medium of a connection similar to that described in the specification of British patent No. 370,122, so that for small overloads the armature moves up slowly and only breaks contact if the overload persists whereas for large overloads said armature moves up quickly and breaks contact almost immediately.

When the contacts 2, 1 open, all three solenoids 12 will be de-energized so that the three plungers 13 will fall simultaneously if the contacts were opened as a result of overload or the remaining two plungers will fall if the contacts were opened as a result of voltage failure in one phase. In either case the contacts 2, 1 will be re-closed but the external connections are such (as for example in Figure 15 of said British patent) that the circuit cannot be re-energized until a "start" push button is actuated.

Cones 8a are mounted on the armature 8 which co-operate with recesses in the lower ends of the plungers 13. The purpose of these cones 8a is to reduce the effective air gap between the bottom of the plungers 12 and the armature 8. Thus a much stronger pull is obtained on the armature 8, and, by virtue of the shape of the cones 8a and conical air gaps a continuously increasing pull is obtained as the cone rises inside the recess in the plunger.

Plugs 13a are also provided on the underside of the top plate 3 in line with the tops of the plungers 13, thereby bringing the top air gap into the most effective part of the field.

Describing now certain electrical and magnetic features of the device, it will be seen that the three plungers 13, together with the top plate 3 and the bottom armature 8 constitute a complete magnetic circuit system. The solenoids 12 are all equal and are wound and connected in the same sense in the respective three phases of an ordinary three phase circuit.

When the plungers 13 are at their down position air gaps exist between the top of the plungers and the top plate 3 and between the bottom of said plungers and the bottom armature 8, and the arrangement is such that like air gaps are all equal.

As the plungers 13 are equidistant from one another the linkage path is therefore equal in all three directions and the instantaneous pole sense when the current is switched on can be N, N, S on the tops of the three plungers as indicated in Figure 2. The instantaneous pull values will then be ½N, ½N, S. The order and value will of course vary according to the instantaneous current values in the three phases at the moment of switching on.

We may thus have three plungers 13 energized magnetically from three solenoids 12, two being of like sense and one of opposite sense, the former having half the pull of the latter; also, the three plungers being linked together as indicated in Figure 2 in a symmetrical iron circuit, the total flux in the linker circuit is, for a given number of ampere turns in the three coils, twice that of the flux derived from the same number of ampere turns in entirely separate single phase circuits. As, however, the air gaps are two in parallel and then in series with the other one the pull is not exactly double but is about 50% greater than in the case of separate single phase circuits.

We thus obtain, by combining the three phases into our common symmetrical magnetic system, the same amount of work with the expenditure of 33⅓% less watts than when using three entirely separate magnetic circuits. This is a great advantage as the apparatus can be made smaller and runs cooler when less watts are required for operation.

Further, supposing, at the moment of switching off the pull values are, as above stated ½N, ½N, and S, we have the S pull attempting to lift in advance of the other two. The interval between this particular pull being a maximum and one of the others being a maximum is 60° or ⅙ of a cycle. This at 50 cycles per second is 1/300 part of a second. Due to the fact that the tilting of the plate 4 requires a definite time period the contacts 2, 1 will not have time to open on account of this instantaneous out of balance of the currents in the three phases. It will be further noted that when the plunger 13 having the greatest pull commences to move up, it shortens its air gap thereby increasing the flux in the common circuit and increasing the pull on the other plungers.

Further, in the event of voltage failure in one phase, if that phase is the one whose plunger is of south polarity while the other two are of north polarity, the remaining two coils will be left connected in series across the remaining two lines, but instead of remaining N, N, they will become N, S as indicated in Figure 3, as they are now connected in opposite sense. Thus there will be a magnetic linkage between the remaining two plungers independently of the other one so that the flux will be short circuited from passing through this latter plunger which will accordingly drop instantaneously.

When the device is applied to two phase circuits, two of the coils 12 are wound in one section and the third coil is wound in two equal sections as shown in Figure 4, the total turns of this latter coil being 40% more than the turns in each of the other coils. By connecting each of the single section coils in like sense and respectively in series with the two sections of the third coil in opposite sense, an equal lifting pull is obtained on all three plungers. Upon failure of either phase one full coil and one half coil are left in circuit in the remaining phase, and, as their instantaneous pole sense is N, S, they form a magnetic linkage which short circuits the flux from the remaining plunger, thereby allowing the same to fall instantaneously.

It will be noted that when one plunger falls, its tendency to lift the armature 8 by tilting the plate 4 is assisted by the force of attraction on said armature exerted by the other two solenoids although this force would not of itself be sufficient to raise said armature. Therefore the time taken to break circuit in response to voltage failure in a phase will be less when the circuits are under considerable load than when the load is only light. This is clearly desirable since the driven device may safely run for a considerable period when it is lightly loaded but must be stopped after a very short interval when the load is heavy.

The following is a list of dimensions which have been found suitable in a device such as that above described:—

| | |
|---|---|
| If length of each coil | =1 |
| Diameter of coil | =.6 |
| Distance between centers of coils | =1.25 |
| Top air gap with plungers down | =.15 |
| Minimum bottom air gap with plungers up | =.2 |
| Maximum bottom air gap with plungers up equals maximum travel of armature | =.5 |
| Length of plungers | =.8 |
| Diameter of plungers | =.36 |
| Length of cones | =.15 |
| Length of plugs | =.3 |

Weight of weights=Weight of plungers less weight of stems.

The device shown in Figures 5–12 is magnetically the same as that just described but the arrangement and operation of the contacts is different. Thus the insulating plate 34 takes the form of an elongated horizontal arm having a contact 32a mounted on its upper side at each end, the two contacts being connected together by the conductor 32. The fixed contacts 31, though mounted by means of arms 31a and blocks 31b from the top magnetic plate 33 as before, are now located above the insulating arm 34 which is biased upwards by means of a strip spring 34a so that the two end contacts 32a thereon are normally pressed into direct engagement with said fixed contacts 31.

The insulating arm 34 is mounted on the top magnetic plate 33 by means of two pins 18 upstanding from said top plate and passing through respective transverse horizontal slots 19 in said insulating arm located fairly near to, and at equal distances one on each side of, the middle point, said pins having nuts 20 on their upper ends to limit the upward movement of said arms. It will thus be seen that the insulating arm 34 may, within limits, be moved bodily in a horizontal direction at right angles to its length and also that it may be rotated within limits about either of said pins 18 as axis.

The insulating arm 34 is so located with respect to the axes of the three plungers 43 that, in the plan view, said arms cut the equilateral triangle of which the three axes constitute the apexes and is parallel to one side of said equilateral triangle. If the two plungers 43 which are thus on one side of the arm 34 are said to be in the front and the remaining plunger at the back, the arrangement is such that when said arm is at its rearmost limit, as shown in Figure 7, the end contacts 32a thereon are in engagement with the fixed contacts 31.

The insulating arm 34 is controlled by means of three actuating bell crank levers 21 operated by the respective weights 47 on the plunger rods 44. These three bell crank levers are pivoted on three fixed brackets 22 about horizontal axes 23 parallel to the insulating arm 34 in its normal position, and they have as shown more or less horizontal arms respectively located underneath the three weights 47 and more or less vertical arms extending downwardly. The horizontal arms of the two front bell crank levers 21 extend forwardly from their axes 23 and the vertical arms of said front bell crank levers engage the forward edge of the insulating arm 34 towards the respective ends thereof. The horizontal arm of the rear bell crank lever 21 extends rearwardly from its axis 23 and the vertical arm engages the rear edge of the insulating arm 34 at the middle thereof. When any plunger 43 falls the respective weight 47 at the top of its plunger rod 44 presses down on the extremity of the horizontal arm of the respective bell crank lever 21 and thereby increases the pressure of the vertical arm of the latter against the insulating arm 34. Thus the two front bell crank levers 21 tend to press the respective ends of the insulating arm 34 rearwardly and the rear bell crank lever 21 tends to press the middle of the insulating arm forwardly. Thus when all three of the plungers 43 are down together as in Figures 5–7, the two front bell crank levers 21 prevail and the whole insulating arm 34 is held bodily at its rearmost position so that the fixed contacts 31 are bridged by the movable contacts 32a as hereinbefore stated. When all the plungers 43 rise together upon energization of the device the insulating arm 34 will remain where it is, and contact will still be established. If however any one of the plungers 43 falls alone as a result of voltage failure in one phase, contact is broken at both of the fixed contacts 31. Thus if the rear plunger 43 falls alone as shown in Figures 8 and 9 the insulating arm 34 will be pushed bodily forward as far as permitted by the transverse slots 19 and contact will be broken between both of the fixed contacts 31 and the respective movable contacts 32a. If one of the front plungers 43 falls alone as shown in Figures 10 and 11 the adjacent end of the insulating arm 34 will be pushed rearwardly and the whole insulating arm will pivot about the forward end of the adjacent slot 19 (which is against its respective pin 18) up to the limit determined by the rear end of the other slot reaching its respective pin. Thus contact will be once again broken at both fixed contacts 31.

In the event of the insulating arm 34 being pushed forwardly by the rear plunger falling as in Figures 8 and 9, the horizontal arm of the front bell crank levers 21 will be thrown upwardly to such an extent that when the two front plungers 43 are subsequently de-energized their weights will not have sufficient leverage on the front bell crank levers to prevail over the rear bell crank lever so the contact will remain broken with the two front plungers still held up.

In like manner when the insulating arm 34 is rotated by one of the front plungers 21 falling as in Figures 10 and 11 the horizontal arms of the other two bell crank levers are thrown upwardly with the same result.

A reset push button 24 is provided having an associated pressure bar 25 which, when the push button is pressed, presses the arm 34 to its normal position, thereby enabling all three weights 47 to fall when said push bottom is released, so that the contacts are again at the closed position.

In the event of an overload occurring the upper end of the vertical rod 35 mounted on the overload armature 38 engages, as shown in Figure 12, an extension 21a on the rear bell crank lever 21 in such a way as to rotate the same in the same manner as if the rear plunger 43 had fallen.

If desired the rod 35 in Figure 12 could be fitted with collars 35a and 35b similar to the collars 5a and 5b shown in Figure 1, operating on the respective sides of a triangular plate suitably pivoted on three pivots, somewhat as in Figure 1, and engaging with the under side of levers 21, so as to introduce a delayed action into the movement of either of these levers for the same purpose as the delayed action in the rocking of the plate 34 in Figure 1.

In this form of the invention there is provided a dash pot 39, cones 38a and solenoids 42 similar to those shown in the first form and for the same purpose.

What I claim and desire to secure by Letters Patent is:—

1. In a controlling device for three phase systems, a set of three parallel solenoid windings each connected in series in a respective phase connection of said system, said windings being located at the angles of a triangular prism, a fixed plate of magnetic material extending over said solenoids at one end of the set, solenoid cores extending slidably through said plate and each actuated by a respective winding, a pair of spaced contacts insulatedly supported from said plate, a tilting member above said plate and through which the upper ends of said cores pass, a bridging member for said contacts on said tilting member, and means on said cores to tilt said tilting member and thereby cause bridging of said contacts.

2. In a controlling device for three phase systems, a set of three parallel solenoid windings each connected in series in a respective phase connection of said system, said windings being located at the angles of a triangular prism, a fixed plate of magnetic material extending over said solenoids at one end of the set, solenoid cores extending slidably through said plate and each actuated by a respective winding, a pair of spaced contacts insulatedly supported from said plate, a tilting member above said plate and through which the upper ends of said cores pass, a bridging member for said contacts on said tilting member, and collars on the upper end of said cores engageable with the upper side of the tilting member to move the bridging member into contact with the spaced contacts in accordance with the direction in which said tilting member is tilted.

3. In a controlling device for three phase systems, a set of three parallel solenoid windings each connected in series in a respective phase connection of said system, said windings being located at the angles of a triangular prism, a fixed plate of magnetic material extending over said solenoids at one end of the set, solenoid cores extending slidably through said plate and each actuated by a respective winding, a pair of spaced contacts insulatedly supported from said plate, a tilting member above said plate and through which the upper ends of said cores pass, a bridging member for said contacts on said tilting member, collars on the upper end of said cores engageable with the upper side of the tilting member to move the bridging member into contact with the spaced contacts in accordance with the direction in which said tilting member is tilted, a second magnetic plate at the opposite end of said windings, a stem on said second plate slidable through the first plate and located centrally between the solenoids, and means on said stem supporting the tilting member.

4. In a controlling device for three phase systems, a set of three parallel solenoid windings each connected in series in a respective phase connection of said system, said windings being located at the angles of a triangular prism, a fixed plate of magnetic material extending over said solenoids at one end of the set, solenoid cores extending slidably through said plate and each actuated by a respective winding, a pair of spaced contacts insulatedly supported from said plate, a tilting member above said plate and through which the upper ends of said cores pass, a bridging member for said contacts on said tilting member, means on said tilting member to bridge said contacts, collars on the upper end of said cores engageable with the upper side of the tilting member to move the bridging member into contact with the spaced contacts in accordance with the direction in which said tilting member is tilted, a support on said plate engaging the tilting member and arranged to permit universal tilting movement of said tilting member, a second magnetic plate at the opposite end of said windings, a stem on said second plate slidable through the first plate and located centrally between the solenoids, and means on said stem supporting the tilting member.

5. A combined voltage failure and overload protection device for polyphase circuits comprising electromagnetic windings for the respective phases, individual no volt armatures for the respective windings, a common overload armature for the several windings, a common control element whose movement determines the response of the device, means whereby said no volt armatures are mechanically correlated to said common control element in such a way that, when all of said no volt armatures move simultaneously to corresponding positions—either attracted or non-attracted—said common control element remains at the non-responsive position but when any of said no volt armatures are at different positions simultaneously said common control element moves to responsive position, means whereby movement of said overload armature in response to overload effects movement of said common control element to responsive position, and a time delay element for delaying the movement of said common control element when effected either by said no volt armatures or by said overload armature.

6. A combined voltage failure and overload protection device for polyphase circuits, comprising a circuit breaker, individual electromagnetic windings for the respective phases, individual no volt armatures for the respective windings, a common overload armature for the several phases, and means whereby said circuit breaker is opened in response to movement of a no-volt winding to the non-attracted position and upon movement of said overload armature to the attracted position.

7. A combined voltage failure and overload protection device for polyphase circuits, comprising a circuit breaker, individual no volt electromagnetic windings for the respective phases, armatures for the respective windings, a common no-volt overload armature for the several phases, and means whereby said circuit breaker is adapted to be opened in response either to the movement of the overload armature to the attracted position or to certain of the no-volt armatures being at different corresponding positions.

8. A voltage failure protection device for polyphase circuits, comprising no-volt electro-magnetic windings for the respective phases of said circuit, vertically movable armatures adapted to be lifted upon energization of the respective windings and permitted to fall upon de-energization thereof, and a common element having a normal position at which said device is non-responsive and being movable from said position to effect response of said device, said armatures having a one way mechanical connection with said common element in such a sense that when said windings are energized said armatures are lifted clear of connection with said common element whereby the latter remains at the normal position, and when said windings are de-energized said armatures fall so as to apply hammer-like forces to said common element by kinetic energy and gravity, said forces being adapted when all applied together, to balance one another leaving the common element at the normal position, but when less than all are applied to move said common element from said normal position to the responsive position.

9. A combined voltage failure and overload protection device for polyphase circuits, comprising no-volt electromagnetic windings for the respective phases of said circuit, vertically movable armatures adapted to be lifted upon energization of the respective windings, and permitted to fall upon deenergization thereof, a common overload armature for the several phases, and a common element having a normal position at which the device is unresponsive and being movable from said position to effect response of said device, said armatures having a one-way connection with said common element in such a sense that when said windings are energized said armatures are lifted clear of connection with said common element whereby the latter remains at the normal position, and when said windings are de-energized said armatures fall so as to apply forces to said common element which forces balance when all applied simultaneously, and effect movement of said common element to the responsive position when less than all are applied, and said common overload armature having a mechanical connection with said common element whereby, upon the occurrence of overload, the no-volt armatures being at the raised position, said common element is moved to the responsive position.

STANLEY ROBERT WRIGHT.